United States Patent [19]

Harris

[11] 3,996,394
[45] Dec. 7, 1976

[54] METHOD OF IMPROVING ADHESION TO PLASTIC SUBSTRATES

[75] Inventor: Edward Bruce Harris, Spring Valley, N.Y.

[73] Assignee: Union Carbide Corporation, New York, N.Y.

[22] Filed: Mar. 24, 1975

[21] Appl. No.: 561,307

[52] U.S. Cl. .............................. 427/54; 204/159.15; 204/159.17
[51] Int. Cl.² ............... C08F 291/04; C08F 291/06
[58] Field of Search ............... 427/54, 44; 260/884, 260/885; 204/159.17, 159.15

[56] References Cited
UNITED STATES PATENTS

| 2,413,973 | 1/1947 | Howk et al. ..................... 427/54 X |
| 3,551,372 | 12/1970 | Bader et al. ..................... 260/884 X |
| 3,924,023 | 12/1975 | Boranian et al. ..................... 427/54 |

Primary Examiner—James R. Hoffman
Attorney, Agent, or Firm—Francis M. Fazio

[57] ABSTRACT

Acrylate ester or methacrylate ester based photocurable compositions having added thereto poly(vinyl acetate) or poly(vinyl chloride/vinyl acetate) copolymers when applied to plastic substrates and cured with ultraviolet radiation show an unexpected improved adhesion to the plastic substrate.

4 Claims, No Drawings

METHOD OF IMPROVING ADHESION TO PLASTIC SUBSTRATES

BACKGROUND OF THE INVENTION

Radiation curable compositions for use in coating and printing ink applications have been in commercial use for several years, but, have all generally been lacking in their ability to adhere well to plastic substrates. These compositions, unlike conventional solvent-based or water-based, thermally dried systems, experience high shrinkage during the conversion from their applied monomeric form to their high density, cured, polymeric form. The shrinkage, due to polymerization and crosslinking, can in some instances approach about 30 percent by volume. Furthermore, because of the rapidity of the polymerization, usually less than one second, there is insufficient exposure to heat during the cure, hence the stresses induced in the newly formed polymer cannot relax and a strong bond between the coating and substrate cannot form or persist. It is believed that this unusually large shrinkage and concomitant stresses are mainly responsible for the inadequate adhesion of radiation cured systems to plastic substrates.

Other explanations proposed for the lack of adhesion of photocurable compositions to plastics are insufficient and improper wetting of the substrate surface and an insufficient population of functional groups that can bond or associate with the substrate. The adhesion problem is encountered to a greater extent in the case of most plastic substrates which have a smooth, non-porous surface which surface resists adhesion resulting from interlocking of the coating with surface irregularities.

Early attempts to minimize or rectify the adhesion problem have included the use of adhesion promoting silicones, the inclusion of functional groups in the coating polymer and the use of concurrent or post heat treatment to relieve the polymer stresses during or after polymerization. Only the latter has shown some effectiveness but this post-treatment is not coincident with one of the major objectives of spontaneous radiation curing, that of reduced energy consumption; it also prolongs the cure cycle and, most importantly, it is impractical as it often causes physical damage to the plastic being coated.

SUMMARY OF THE INVENTION

A method has been found for improving the adhesion of acrylate ester or methacrylate ester based photocurable compositions to a plastic substrate. This method entails the addition to said composition, which also contains a photoinitiator or photosensitizer, of a poly(vinyl acetate) or of a poly(vinyl chloride/vinyl acetate) copolymer, applying said composition to the plastic substrate and exposing the applied ink or coating composition applied to the plastic substrate to ultraviolet light radiation to cure the composition to a dry, tack-free state.

DESCRIPTION OF THE INVENTION

Many photocurable coating and ink compositions based on acrylate esters or methacrylate esters are known in the art. These compositions contain a photosensitizer or photoinitiator to facilitate cure when exposed to ultraviolet light radiation. However, the adhesion of these radiation photocurable coatings or inks to plastic substrates leaves much to be desired. It has now been found that the adhesion thereto can be improved by the addition of certain polymers to the defined coating or ink compositions. These polymers are limited in scope and they are essentially soluble in the coating or ink composition.

The coating and ink used in the method of this invention are generally mixtures of monofunctional and polyfunctional acrylates or methacrylates. They can also contain a small amount, preferably less than 10 weight percent of the composition, of another polymerizable monomer that is not an acrylate or methacrylate ester; however, the preferred compositions do not include such other monomer. The monofunctional acrylate and methacrylate esters present in the compositions used in this invention are well known to those skilled in the art and include methyl acrylate, ethyl acrylate, hexyl acrylate, 2-ethylhexyl acrylate, butyl acrylate, 2-hydroxyethyl acrylate, dicyclopentenyl acrylate, (methylcarbamylethyl acrylate, 2-phenoxyethyl acrylate, 2-methoxy ethyl acrylate, glycidyl acrylate, 2-(N,N-diethylamine)ethyl acrylate, 2-hydroxypropyl acrylate, and the like. As previously indicated, monofunctional acrylate esters are well known and the above enumeration is merely illustrative of just a few of the acrylate esters known and useful. In addition, the corresponding methacrylate esters of the above acrylates are also known and useful for the production of coating and ink compositions. It is to be noted that any of the known polymerizable monofunctional acrylates or methacrylates can be used.

The polyfunctional acrylate and methacrylate esters useful in the coating compositions used in this invention are also well known to those skilled in the art and illustrative thereof one can use any of the esters having from 2 to 6 acrylate or methacrylate groups in the molecule. Illustrative thereof are neopentyl glycol diacrylate, ethylene glycol diacrylate, propylene glycol diacrylate, diethylene glycol diacrylate, hexylene glycol diacrylate, trimethylolpropane triacrylate, pentaerythritol di-, or tri-, or tetra-acrylate or mixtures thereof, acrylated fatty acid and fatty oil epoxidized, such as acrylated linseed oil or soybean oil or tall oil or linoleic acid or linolenic or eleostearic acid or arachidonic acid, dipentaerythritol hexaacrylate, and the like. As previously indicated, any of the known polyfunctional acrylates known to be useful in the radiation curable ink and coating field can be used to prepare the compositions; hence, the above listing is merely illustrative and not all inclusive. Further, the corresponding methacrylates of the above polyfunctional acrylates can also be used.

In addition to the monofunctional and polyfunctional acrylate and methacrylate esters there is also present in the coating composition a photosensitizer or photoinitiator and, if one desires, an activator. These components can be used individually or in combination, with the total amount varying from 0.01 to 20 percent by weight of the photocurable composition. A preferred amount is from 0.1 to 5 percent by weight, with an amount of from 0.5 to 2 percent by weight most preferred. With some combinations one may observe a synergistic effect. These additives and the use thereof are well known in the art and do not require extensive discussions; therefore, only a limited number will be referred to, it being understood that any compound possessing the ability to function in such manner can be used. As suitable photosensitizers one can mention acetophenone, propiophenone, benzophenone, xanthone, thioxanthone, fluorenone, benzaldehyde, fluorene, anthraquinone, triphenylamine, carbazole, 2- or 3- or 4-methylacetophenone, 2- or 3- or 4-methoxyacetophenone, 2- or 3- or 4-bromoacetophenone, 3- or 4-allylacetophenone, m- or p-diacetylbenzene, 2-or 3- or 4-methoxybenzophenone, 3,3'- or 3,4'or 4,4'-dimethoxybenzophenone, 4-chloro-4'-benzylbenzophenone, 2- or 3-chloroxanthone, 3,9-dichloroxanthone, 2- or 3-chlorothioxanthone, 3-chloro-8-nonylxanthone, 3-methoxyxanthone, 3-iodoxanthone, 2-acetyl-4-methylphenyl acetate, benzoin, alkyl, and aryl ethers of benzoin, the phenylglyoxal alkyl acetals, 2,2'-dimethoxy-2-phenylacetophenone, 2,2-diethoxyacetophenone, 2,2-diisopropoxyacetophenone, 1,3-diphenyl acetone, naphthalene sulfonyl chloride, toluene sulfonyl chloride, and the like. As suitable activators that can be used in conjunction with the photosensitizers one can mention the organic amines such as methylamine, decylamine, diisopropylamine, tributylamine, tri-2-chloroethylamine, ethanolamine, triethanolamine, methyldiethanolamine, 2-aminoethylethanolamine, allylamine, cyclohexylamine, cyclopentadienylamine, diphenylamine, ditolylamine, trixylylamine, tribenzylamine, N-cyclohexylethyleneimine, piperidine, 2-methylpiperidine, N-ethylpiperidine, 1,2,-3,4-tetrahydropyridine, 2- or 3- or 4-picoline, morpholine, N-methylmorpholine, piperazine, N-methylpiperazine, 2,2-dimethyl-1,3-bis-[3-(N-morpholinyl)propionyloxy]-propane, 1,5-bis[3-(N-morpholinyl)propionyloxy]diethyl ether.

The mixture of monofunctional and polyfunctional acrylates can vary in the content of each of said components therein. Thus, the amount of monofunctional acrylate or methacrylate or mixture thereof can vary from 0 to 60 weight percent, preferably from 5 to 30 weight percent of the mixture with the balance of said mixture being the polyfunctional acrylate or methacrylate ester or mixture thereof.

Our invention is the discovery that the addition of from 10 to 50 weight percent, preferably from 10 to 35 weight percent of certain vinyl polymers that are per se essentially inert to photocuring by ultraviolet radiation and which are essentially completely soluble in the mixture of acrylate esters or methacrylate esters defined above will improve the adhesion of the coating or ink vehicle to a plastic substrate when applied and cured by ultraviolet light radiation according to the method of this invention. The vinyl polymers that exhibit this improvement in the acrylate ester or methacrylate ester based radiation photocurable coating and ink vehicles applied and cured by this invention are poly(vinyl acetate) and the copolymers of vinyl chloride and vinyl acetate wherein the vinyl chloride content of said copolymers is from 55 to 90 weight percent of said copolymer. These vinyl polymers are well known to those skilled in the art and many are commercially available. Any of the known copolymers can be used including those containing a small amount of another comonomer polymerized therein. The preferred vinyl polymers are those having a low molecular weight that are essentially completely soluble in the coating or ink vehicle.

The compositions used in the improved method of this invention can also include pigments and other additives typically present in coatings and inks. These are added in their conventional and well known quantities and include, colorants, flow control agents, fungicides, antistats, and other materials conventionally added. The types and amounts thereof are well known to those skilled in the art and hence, do not require further elaboration herein.

The ink or coating compositions are prepared by any suitable mixing procedure. They are applied to the plastic substrate by conventional printing and coating techniques known in the art. Curing of the applied coating or ink is accomplished by exposure to ultraviolet light radiation for a period of time sufficient to cure the applied ink or coating to a dry tack-free state. Many forms of ultraviolet radiation curing equipment are commercially available with a particularly preferred method being that described in U.S. Pat. No. 3,840,448.

Among the organic plastic substrates which have been shown to exhibit unexpectedly improved adhesion of the above described coating and ink vehicles are vinyl coated wall paper, polyvinyl chloride, copolymers of vinyl chloride and vinyl acetate, polyesters, nitrocellulose, chlorinated rubber, polyespoxides, polyamides, polyolefins, surface treated polyolefins, polyacrylates, and the like. Any plastic substrate can be used and it can be in any form, such as film, sheet, plaque, fiber, fabric, and the like. A particularly important application of the method of this invention is the manufacture of decorative vinyl coated wall covering in which a decorative pattern is applied to the vinyl surface. Vinyl coated wall coverings are extensively used and require a strongly adhered design so that repeated washings do not result in peeling of the finished coating or ink applied to the surface thereof. It was a completely unexpected and unobvious finding that improved adhesion to plastic substrates was observed only with the defined composition applied and cured by the method of this invention.

Adhesion of the ink or coating to the plastic substrates was measured by applying and curing the coating or ink by the method of the instant invention and determining the percentage thereof remaining after a tape pull (MMM Scotch Tape No. 610) on a grid of razor blade cuts, 10 in each direction, each ⅛ inch apart. The following examples further serve to illustrate the invention; parts are by weight unless otherwise indicated.

EXAMPLE 1

A photocurable composition was prepared containing 30 parts of poly(vinyl acetate) having an inherent viscosity of 0.12 that were dissolved in a mixture of 40 parts of 2-hydroxyethyl acrylate, 20 parts of neopentyl glycol diacrylate, 10 parts of 2-ethylhexyl acrylate, and one part of 2,2-diethoxyacetophenone. This composition was applied to a vinyl coated wall covering. This wall convering consisted of a film of plasticized poly(vinyl chloride) that had been extrusion coated on to a woven fabric substrate. The photocurable composition was applied to the plastic surface at a wet film thickness of approximately 0.8 mil using a No. 10 wire-wound rod. The coating on the wall covering was cured by exposure to ultraviolet light radiation of 2,537 Angstrom units with a delivered flux of 65 watts per square foot under a nitrogen atmosphere for an exposure of 0.6 second followed by exposure to ultraviolet light radiation from three 100 watts/inch medium pressure mercury lamps with a delivered ultraviolet flux of 500 watts per square foot in an air atmosphere for 0.6 second. The coating cured to a hard, flexible and glossy film and when the cured coating was tested for adhesion none of the film was removed from the poly(vinyl chloride) substrate.

For comparative purposes a coating composition was prepared which did not contain the poly(vinyl acetate). This comparative composition contained 30 parts of acrylated epoxidized linseed oil having an average of 2.8 acrylate groups, 20 parts of neopentyl glycol diacrylate, 40 parts of 2-hydroxyethyl acrylate, 10 parts of 2-ethylhexyl acrylate, and one part of diethoxyacetophenone. This composition was applied to the plastic surface of a poly(vinyl chloride) coated wall covering and cured in the same manner as described above. The cured film was hard and flexible but showed extremely poor adhesion to the poly(vinyl chloride) in that it was completely removed when evaluated by the same adhesion test.

EXAMPLE 2

A 57/43 low molecular weight poly(vinyl chloride/vinyl acetate) copolymer was produced by charging 120 grams of vinyl chloride, 240 grams of vinyl acetate, 1,125 grams of acetone, and a solution of 2.6 grams of isopropylperoxydicarbonate in 15 grams of acetone to an autoclave. Over a period of about 3.5 hours, a feed mixture of 480 grams of vinyl chloride and 445 grams of vinyl acetate was added. This was followed over a period of about 23 hours by a mixture of 825 grams of vinyl chloride, 925 grams of vinyl acetate and 1,680 grams of acetone, while simultaneously removing reaction product so as to maintain a substantially constant volume in the reactor. Throughout the polymerization, an additional quantity of 80 grams of the catalyst in 450 grams of acetone was added, as required. The polymerization was carried out at a temperature of about 80° C. and a pressure of about 42 to 96 psig. At the end of the polymerization reaction, the contents of the reactor were combined with the product recovered during the reaction. The solution was slowly poured into cold methanol at a temperature of −20° C. to precipitate the polymer. The polymer was recovered, redissolved in acetone and reprecipitated in cold methanol at −20° C. The precipitated resin was recovered by decantation, washed with a 50:50 methanol:ice mixture, decanted and the wash repeated. The polymer was given a final wash with cold water and then dried in an air oven at 35° C. The dried polymer had an inherent visocsity of 0.106. The coating or ink composition was produced by dissolving 20 parts of the copolymer produced above in a mixture of 30 parts of acrylated epoxidized linseed oil having an average of 2.8 acrylate groups, 15 parts of neopentyl glycol diacrylate, 25 parts of 2-hydroxyethyl acrylate, 10 parts of 2-ethylhexyl acrylate, and one part of diethoxyacetophenone. This photocurable composition was applied to the surface of the same vinyl coated wall covering used in Example 1 and cured in the same manner described therein. The cured coating was hard, flexible and glossy and showed complete adhesion to the plastic substrate to which it had been applied.

EXAMPLE 3

A photocurable composition was prepared by dissolving 10 parts of an 81/4/15 poly(vinyl chloride/vinyl acetate/2-hydroxypropyl acrylate)terpolymer in a mixture of 35 parts of an acrylated epoxidized linseed oil having an average of 2.8 acrylate groups, 8 parts of neopentyl glycol diacrylate, 30 parts of 2-hydroxyethyl acrylate, 16 parts of 2-ethylhexyl acrylate, and one part of 2,2-diethoxyacetophenone. This photocurable composition was applied to the surface of the same poly(vinyl chloride) coated wall covering used in Example 1 and cured as therein described. Adhesion was excellent with only 10 percent of the coating being removed when tested by the adhesion text described previously.

EXAMPLE 4

The photocurable composition described in Example 1 was applied to the surface of a poly(vinyl chloride/vinyl acetate) copolymer film. The coating was applied using a No. 7 wire-wound rod to give a wet film thickness of about 0.5 mil. This coating was cured by exposure to 2,537 Angstrom radiation under nitrogen for 0.9 second and to ultraviolet radiation from medium pressure mercury lamps in air for 0.9 second as described in Example 1. The cured coating was hard, flexible and glossy and had excellent adhesion to the copolymer plastic substrate with none of the film removed when evaluated by the adhesion test.

For comparative purposes the same comparative coating used in Example 1 was applied to the surface of the same poly(vinyl chloride/vinyl acetate) copolymer film described above, cured in the same manner and its adhesion was determined. It was found that more than 90 percent of this coating composition, which did not contain the vinyl polymer, was removed from the copolymer film substrate. This indicates the importance of the presence of a vinyl polymer in the coating or ink composition for adhesion to a plastic substrate.

EXAMPLE 5

The photocurable composition of Example 2 was applied to the surface of the same plastic substrate described in Example 4 and cured in the same manner as therein described. The cured film was hard, flexible and glossy and had excellent adhesion with none of the film removed when evaluated by the described adhesion test.

EXAMPLE 6

The coating composition of Example 3 was applied to the surface of the same plastic substrate described in Example 4 and cured in the same manner as therein described. The cured coating was clear, flexible and hard and had 100 percent adhesion to the plastic substrate.

EXAMPLE 7

A photocurable composition of excellent adhesion was prepared by dissolving 4 parts of the same terpolymer used in Example 3 and 6 parts of poly(vinyl acetate) having an inherent viscosity of 0.12 in a mixture of 8 parts of neopentyl glycol diacrylate, 30 parts of 2-hydroxyethyl acrylate, 16 parts of 2-ethylhexyl acrylate, 35 parts of acrylated epoxidized linseed oil having an average of 2.8 acrylate groups, and one part of 2,2-diethoxyacetophenone. This composition was applied to the surface of the same plastic substrate described in Example 4 and cured in the manner therein set forth. The cured coating was hard and flexible and had 100 percent adhesion to the surface.

EXAMPLE 8

A series of three photocurable formulations was prepared as set forth below:

| Formulation | I | II | III |
|---|---|---|---|
| Epoxidized linseed oil acrylate | 40 | 40 | 35 |
| Neopentylglycol diacrylate | 13 | 18 | 8 |
| 2-Hydroxyethyl acrylate | 20 | 10 | 30 |
| 2-Ethylhexyl acrylate | 16 | 21 | 16 |
| Vinyl resin* | 10 | 10 | 10 |
| 2,2-Diethoxyacetophenone | 1.0 | 1.0 | 1.0 |

*The same vinyl terpolymer described in Example 3

Each of the photocurable compositions were applied at a wet film thickness of 0.5 mil to the surface of a commercially available polyester film and cured as described in Example 1 using an exposure time of 1.9 seconds to the 2,537 Angstrom radiation under nitrogen and 1.9 seconds to the ultraviolet radiation from the medium pressure mercury lamps in air. All of the coatings show 100 percent adhesion to the polyester plastic film substrate.

For comparative purposes the control composition described in Example 1 was also applied to the surface of the polyester film and cured in the same manner. This cured coating had exceptionally poor adhesion to the polyester film plastic substrate with more than 80 percent of the coating being removed when it was evaluated by the adhesion test. The results show the importance of the addition of the vinyl resin to the photocurable composition if one wishes to obtain adhesion of the photocurable composition to a plastic substrate by the methods of this invention.

EXAMPLE 9

A series of four photocurable compositions was prepared as described below:

| Formulation | I | II | III | IV |
|---|---|---|---|---|
| Epoxidized linseed oil acrylate | 35 | 25 | 35 | — |
| Neopentylglycol diacrylate | 8 | 8 | 18 | 20 |
| 2-Hydroxyethyl acrylate | 30 | 30 | 10 | 40 |
| 2-Ethylhexyl acrylate | 16 | 16 | 21 | 10 |
| Poly(vinyl acetate) | 10 | 20 | 15 | 30 |
| 2,2-Diethoxyacetophenone | 1.0 | 1.0 | 1.0 | 1.0 |

Each composition was applied to the surface of the same polyester film referred to in Example 8 and cured in the same manner as therein described. Formulations I, II and III showed excellent adhesion to the plastic substrate with 100 percent of the photocurable composition remaining adhered thereto. Formulation IV, which did not contain the epoxidized linseed oil acrylate component had poorer adhesion with 40 percent of the photocured coating removable when evaluated by the adhesion test. However, the adhesion of this composition was still much better than the adhesion observed for the comparative material set forth following Example 8 wherein it was shown that 80 percent of the coating was removed.

EXAMPLE 10

A photocurable composition of excellent adhesion was prepared by dissolving 5 parts of the vinyl terpolymer used in Example 3 and 5 parts of the poly(vinyl acetate) used in Example 1 in a mixture of 35 parts of acrylated epoxidized linseed oil having an average of 2.8 acrylate groups, 8 parts of neopentyl glycol diacrylate, 30 parts of 2-hydroxyethyl acrylate, 60 parts of 2-ethylhexyl acrylate and 1 part of 2,2-diethoxyacetophenone. The composition was applied to the surface of a polyester film substrate and cured as described in Example 8. A hard, flexible, clear, glossy film was obtained having excellent adhesion, with less than 10 percent of the coating being removable when evaluated by the adhesion test.

EXAMPLE 11

Two photocurable coating compositions were prepared having the following formulations:

| Formulation | I | II |
|---|---|---|
| Epoxidized linseed oil acrylate | 35 | 35 |
| Neopentyl glycol diacrylate | 8 | 8 |
| 2-Hydroxyethyl acrylate | 30 | 30 |
| 2-Ethylhexyl acrylate | 16 | 16 |
| Vinyl Resin A | 10 | — |
| Vinyl Resin B | — | 10 |
| 2,2-Diethoxyacetophenone | 1 | 1 |

Vinyl Resin A = 81/17/2 vinyl chloride/vinyl acetate/maleic anhydride; inherent viscosity of 0.32 (measured by dissolving 0.2 gram of resin in 100 mls. of cyclohexanone).
Vinyl Resin B = 83/16/1 terpolymer, inherent viscosity of 0.37

These compositions were applied to the surface of a polyester film substrate and cured as described in Example 8. The photocured coatings had excellent adhesion to the plastic substrate with 100 percent of the photocured film adhering thereto.

EXAMPLE 12

A photocurable composition was prepared by dissolving 20 parts by weight of the poly(vinyl chloride/vinyl acetate) copolymer described in Example 3 in a mixture of 30 parts of acrylated epoxidized linseed oil having an average of 2.8 acrylate groups, 15 parts of neopentyl glycol diacrylate, 25 parts of 2-hydroxyethyl acrylate, 10 parts of 2-ethylhexyl acrylate, and one part of 2,2-diethoxyacetophenone. This composition was applied to the surface of a commercially available corona-discharge-treated polyethylene using a No. 7 wire-wound rod and then cured as described in Example 8. The photocured coating had excellent 100 percent adhesion to the plastic substrate.

For comparative purposes the comparative formulation described under Example 1 which did not contain a vinyl resin was also applied to and cured on the same corona-discharge-treated polyethylene in the same manner. This cured coating was completely removed when evaluated by the adhesion test.

EXAMPLE 13

A series of photocurable formulations was prepared as shown below:

| Formulation | I | II | III |
|---|---|---|---|
| Epoxidized linseed oil acrylate | — | — | 45.5 |
| Neopentyl glycol diacrylate | 73.5 | 66 | 53.5 |
| 2-Ethylhexyl acrylate | — | 15 | — |
| Poly(vinyl acetate) | 26.5 | 22 | — |
| 2,2-Diethoxyacetophenone | 1.0 | 1.0 | 1.0 |

These formulations were applied at a thickness of 0.1 mil to the plastic coated side of a laminate of aluminum foil coated with 0.1 mil of a white pigmented nitrocellulose lacquer. The coatings were all cured by exposure to 2,537 Angstrom radiation under nitrogen for 0.3 second followed by exposure to ultraviolet radiation from medium pressure mercury lamps in air for 0.3 second as described in Example 1. Formulations I and II, which contained the vinyl resin component, showed excellent 100 percent adhesion to the nitrocellulose plastic substrate after photocuring. Formulation III, which did not contain the poly(vinyl acetate) had absolutely no adhesion to the nitrocellulose plastic substrate with 100 percent thereof being removed when it was evaluated by the adhesion test.

EXAMPLE 14

The photocurable compositions of Example 13 were applied to the plastic coated side of an aluminum foil laminate which was coated with 0.1 mil of a white pigmented chlorinated rubber based lacquer. The photocurable compositions were applied at a thickness of 0.1 mil and cured as described in Example 13. The coatings of formulations I and II showed 100 percent adhesion to the chlorinated rubber plastic substrate whereas the composition of formulation III showed very poor adhesion with 100 percent of the coating removed from the chlorinated rubber based substrate when it was evaluated by the adhesion test.

EXAMPLE 15

A series of photocurable compositions was prepared having the following components:

| Formulation | I | II | III | IV | V |
|---|---|---|---|---|---|
| Poly(vinyl acetate) | 35 | 28 | 23.3 | — | — |
| Neopentyl glycol diacrylate | 35 | 42 | 46.7 | 55 | 30 |
| 2-Ethylhexyl acrylate | 6 | 6 | 6 | 15 | 15 |
| 2-Hydroxyethyl acrylate | 13 | 13 | 13 | — | 25 |
| Linseed oil epoxide acrylate | 10 | 10 | 10 | 30 | 30 |
| 2,2-Diethoxyacetophenone | 1 | 1 | 1 | 1 | 1 |

Each photocurable composition was applied at a thickness of 1 mil to the surface of a molded, thermoset, fiberglass filled epoxy resin board and cured in the manner described in Example 1 using an exposure time of 2 seconds to the 2,537 Angstrom radiation under nitrogen and 2 seconds to the ultraviolet radiation from the medium pressure mercury lamps in air. Formulations I, II and III showed excellent adhesion to the plastic substrate whereas formulations IV and V, which did not contain the poly(vinyl acetate) resin component, showed no adhesion to the epoxy plastic substrate with 100 percent of the cured coating being removed when tested by the adhesion test.

When the coatings described in the examples are applied in a decorative design or by imprint to the plastic surface and cured, similar adhesion results are obtained.

EXAMPLE 16

A photocurable composition was prepared by dissolving 25 parts by weight of a solid bisphenolacetone glycidyl ether epoxy resin in a mixture of 20 parts by weight of neopentyl glycol diacrylate, 40 parts of 2-hydroxyethyl acrylate, 15 parts of 2-ethylhexyl acrylate and 1.0 parts of 2,2-diethoxyacetophenone. This composition was applied to the surface of the same poly(vinyl chloride) coated wall covering used in Example 1 and the coating was cured as therein described. Adhesion was excellent; none of the coating being removed when tested by the adhesion test described previously.

For comparative purposes, a formulation in which the bisphenol-acetone epoxy resin was replaced by 25 parts by weight of acrylated epoxidized linseed oil having an average of 2.8 acrylate groups was applied and cured on the same vinyl wall covering substrate in the same manner as above. This cured coating was completely removed when evaluated by the adhesion test.

EXAMPLE 17

A photocurable composition was prepared by dissolving 25 parts by weight of a low molecular weight cellulose acetate butyrate resin in a mixture of 20 parts of neopentyl glycol diacrylate, 40 parts of 2-hydroxyethyl acrylate, 15 parts of 2-ethylhexyl acrylate and 1.0 parts of 2,2-diethoxyacetophenone. This composition was applied to the surface of the poly(vinyl chloride) coated wall covering in Example 1 and cured as therein described. Adhesion was excellent; none of the coating being removed when tested by the adhesion test previously described.

For comparative purposes, a formulation in which the cellulose acetate butyrate resin was replaced by 25 parts by weight of acrylated epoxidized linseed oil having an average of 2.8 acrylate groups was applied and cured on the same vinyl wall covering substrate in the same manner as above. This cured coating was completely removed when evaluated by the adhesion test.

What I claim is:

1. A method for improving the adhesion of an acrylate ester or methacrylate ester based radiation photocurable coating or ink vehicle to a plastic substrate, wherein said vehicle comprises (i) a photoinitiator or photosensitizer and (ii) a mixture of photopolymerizable monofunctional and polyfunctional acrylate or methacrylate esters; said method comprising adding to said vehicle from 10 to 50 weight percent based on the weight of the total composition of poly(vinyl acetate) or a poly(vinyl chloride/vinyl acetate) polymer having a polymerized vinyl chloride content of from about 55 to about 90 mole percent, said poly(vinyl acetate) or poly(vinyl chloride/vinyl acetate) polymer being essentially soluble in said esters mixture, applying the modified ink or coating to a plastic substrate, and exposing the applied ink or coating to ultraviolet light radiation for a period of time sufficient to cure said applied ink or coating on said plastic substrate to a dry tack-free state.

2. A method as claimed in claim 1, wherein said vehicle contains from 10 to 35 weight percent of said poly(vinyl acetate) or said poly(vinyl chloride/vinyl acetate) copolymer.

3. A method as claimed in claim 2, wherein said vehicle contains a poly(vinyl acetate).

4. A method as claimed in claim 2, wherein said vehicle contains a poly(vinyl chloride/vinyl acetate).

* * * * *